UNITED STATES PATENT OFFICE.

FREDERICK G. BELL, OF NEW YORK, ASSIGNOR TO SAMUEL E. COX, OF HAVERSTRAW, NEW YORK.

IMPROVEMENT IN LEATHER-DRESSING COMPOUNDS.

Specification forming part of Letters Patent No. 135,310, dated January 28, 1873.

*To all whom it may concern:*

Be it known that I, FREDERICK G. BELL, of New York city, State of New York, have invented an Improved Process of Preparing Dressing for Leather, of which the following is a specification:

This improved dressing for leather has for its object to clean and preserve the leather, as well as to give it a good appearance.

Take of castile soap twenty pounds; sixteen pounds of common soda, (wash soda;) one-half pound of bayberry tallow; one-half pound of carbonate of ammonia; one-half pound of borax; one-half pound of gum tragacanth; two pounds of lamp-black; and two gallons of neatsfoot oil; and eighteen gallons of water.

First dissolve the soap in six gallons of hot water; add thereto the soda, borax, and ammonia; dissolve in one gallon of water the bayberry tallow and add to the above, and then put the gum tragacanth, lamp-black, and oil into the mixture and give it a boil; then turn in the remaining eleven gallons of cold water, let it cool, and it is ready for use.

I claim as my invention—

The process of preparing dressing for leather, substantially as described.

This specification signed this 11th day of January, 1873.

FREDERICK G. BELL.

Witnesses:
ANTON C. CRONDAL,
FRANKLIN BARRITT.